United States Patent

[11] 3,600,978

| [72] | Inventor | John W. Turner |
| | | 2021 North Ross, Santa Ana, Calif. 92706 |
| [21] | Appl. No. | 849,709 |
| [22] | Filed | Aug. 13, 1969 |
| [45] | Patented | Aug. 24, 1971 |

[54] CLUTCH AND THROTTLE CONTROL FOR OUTBOARD MOTORS
13 Claims, 5 Drawing Figs.

[52] U.S. Cl. .................................................... 74/875
[51] Int. Cl. .................................................. B60k 21/00
[50] Field of Search ........................................... 74/843, 872–876

[56] References Cited
UNITED STATES PATENTS

| 2,730,910 | 1/1956 | Province | 74/843 |
| 2,847,870 | 8/1958 | Erxleben | 74/843 |
| 2,919,772 | 1/1960 | Morse | 74/875 X |
| 2,947,191 | 8/1960 | Vaner | 74/875 X |
| 2,967,436 | 1/1961 | Steinlein | 74/875 X |
| 3,220,281 | 11/1965 | Irgens | 74/875 |
| 3,290,957 | 12/1966 | Crist | 74/843 |
| 3,470,771 | 10/1969 | Hoak | 74/876 |

Primary Examiner—Arthur T. McKeon
Attorney—Nienow & Frater

ABSTRACT: Controller mechanism in which the position of two rotationally displaceable output elements is controlled from a single displacing or operating member in coordinated fashion through the medium of a motion translating structure employing two cams rotatable on a single shaft and formed so that one output member is rotated in a direction and degree determined by the direction and degree of movement of the displacing member over a midregion only of its total displacement range and so that the other control element is repositioned in a degree determined by the position of the operating element outside that midrange.

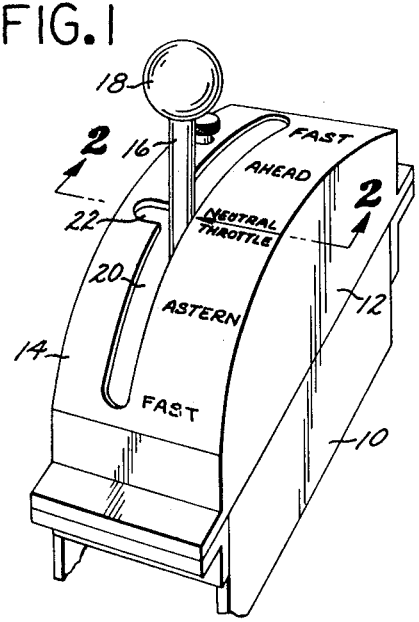
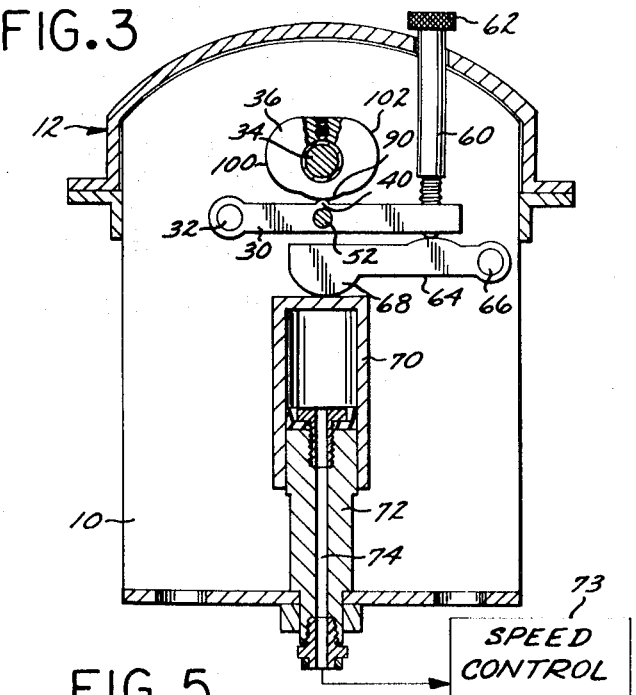
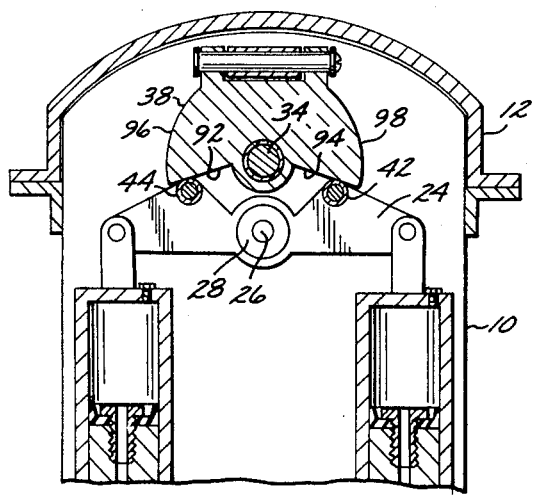
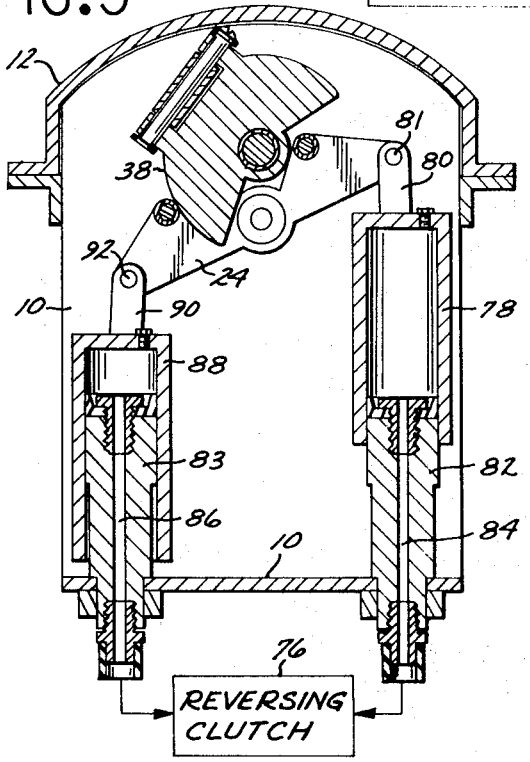
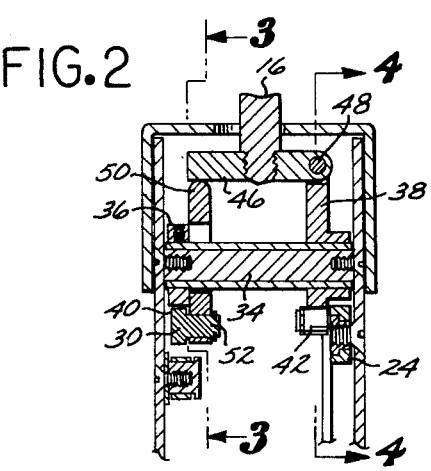

CLUTCH AND THROTTLE CONTROL FOR OUTBOARD MOTORS

This invention relates to improvements in controller mechanisms and it relates particularly to controller mechanisms of the kind in which motion and position change in a single input element results in coordinated displacement and position control of multiple output elements. The provision of improved controllers of this class is one of the objects of the invention.

One application for controllers of this kind is in coordinated control of speed and direction and another object of the invention is to provide an improved speed and direction controller. Such devices are used in controlling the speed and direction of winches and cranes and vehicles of various kinds, and in a wide variety of other applications. The invention is capable of embodiment in a speed and direction controller for combination with the speed control mechanism and with the forward and reverse clutching mechanisms of powered vessels. An object of the invention is to provide an improved controller for these applications generally and for powered boats and vessels in particular. An embodiment intended for this application has been selected for illustration in the accompanying drawings.

It is a particular object of the invention to provide a controller mechanism suitable for actuating hydraulic speed and clutch control systems. Other objects are to provide a controller structure which can be manufactured in rugged and reliable form, in a positive acting form, in a form suitable for the marine environment, and in a form which is not unduly complex or costly to produce.

These and other objects of the invention which will hereinafter appear are realized in part by the provision of a controller comprising a first control element pivotally mounted for rotational displacement to positions in opposite directions from a reference position to end positions; a second control element pivotally mounted for rotational displacement to positions in one direction from an initial position; a displacement element displacable in a plane through first and second end ranges of positions and a midrange of positions between said end ranges including a reference position within said midrange of positions; and motion translating means responsive to the position of said displacement element for positioning said first control element such that it occupies its reference position when the displacable element occupies its reference position, and such that it occupies positions between its reference position and one of its end positions when the displacable element occupies a position in its midrange of positions on the side of its reference position toward its first end range of positions, and such that the first control element occupies positions between its reference position and the other of its end positions when the displacable element occupies a position in its midrange of positions on the other side of its reference position toward its second end range of positions, and such that said first control element occupies one or the other of its end positions when said displacable element occupies a position in the first or second, respectively, of its end ranges; said motion translating means further being responsive to the position of said displacement means for positioning said second control element such that it occupies its reference position when the displacement element is positioned within its midrange of positions, and such that said second control element is displaced from its reference position when the displacement element occupies either of its end range of positions.

In the drawings:

FIG. 1 is an isometric view of a speed and direction controller embodying the invention;

FIG. 2 is a cross-sectional view of the controller taken on line 2—2 of FIG. 1;

FIG 3 is a cross-sectional view of the controller taken on line 3—3 of FIG. 2;

FIG. 4 is a cross-sectional view of a fragment of the controller taken on line 4—4 of FIG. 2; and FIG. 5 is a cross-sectional view taken on the same plane as is FIG. 4 showing the condition of the clutch control portion of the controller in the "full astern" position.

Referring to FIG. 1 of the drawing, the controller there shown comprises a housing the upper portion 10 of which contains its working parts. The upper end of the housing is covered by a cover member 12 whose upper surface 14 is slotted to accommodate the shank 16 of an operating handle which terminates in a spherical hand grip 18. The slot 20 extends in a plane substantially across the top face 14 of the cover member. Midway along its length the slot expands into a sidewise extension 22 which, like slot 20, has width to accommodate the shank 16 of the operating handle. Legends "-NEUTRAL" and "THROTTLE" marked on the upper face of the cover top 14 at the midposition along the length of slot 20 indicate that in this position of the handle the clutching mechanism controlled by the controller is in a neutral position and it indicates that movement of the handle to the left in FIG. 1, into slot 22, accomplishes a throttle action. In this embodiment that throttle action is such as to increase operating speed of the associated motive means.

The controller is intended for mounting in a boat such that the slot 20 lies fore and aft with the legend "AHEAD" toward the bow of the boat and with the legend "ASTERN" toward the stern of the boat. The extreme forward position of the slot is marked by the legend "FAST" formed on the upper surface 14 of the cover. The cover is marked with the legend "AHEAD" intermediate the neutral position and that fast position. That end of the slot 20 toward the rear is marked with the legend "FAST" and at an intermediate point between neutral and that fast legend the cover member 14 is marked with the previously mentioned legend "ASTERN."

The mechanism within the controller permits the prime mover to idle while disengaged from the propulsion structure when the operating handle has a position shown and when connected to appropriate speed control or throttle mechanism and a reversing clutch. If the operating handle is moved to the left in FIG. 1 the speed of the prime mover will be increased but the prime mover will remain disengaged from the propulsion apparatus. If the operating handle is returned to the main slot 20 and moved forward, the engine speed will not be increased until the handle is moved to the legend "AHEAD" and beyond toward the legend "FAST." As the operating handle is moved forward from the "AHEAD" to the "FAST" positions prime mover speed will be increased. If instead the operating handle is moved rearwardly, there will be no increase in prime mover speed at handle positions between "-NEUTRAL" and "ASTERN" but further movement results in increased prime mover speed. The speed increases with the degree of handle movement past the legend "ASTERN." As the handle is moved forwardly from the "NEUTRAL" position to the "AHEAD" position, a force is developed which tends to engage the prime mover and the propulsion apparatus. When the handle is moved beyond the "AHEAD" position full force is applied to the clutching system and the clutch is fully engaged for forward propulsion. As the handle is moved rearwardly from the "NEUTRAL" position towards the "ASTERN" position an increasing force is applied to the clutching mechanism tending to engage the prime mover with the propulsion apparatus in the reverse direction. Thus full pressure is applied to the clutch in any handle position between "ASTERN" and the rearward "FAST" position.

The controller mechanism includes two output elements. A first one of these controls clutch operation in this embodiment and the other output control element effects throttling or speed control action. The first control element is advantageously pivotally mounted for rotational displacement in opposite directions from a reference position to end positions. The second control element advantageously is pivotally mounted for rotational displacement to positions in one direction from an initial position. In the embodiment selected for illustration in the drawing, the first control element has the form of a rocker arm 24 which is mounted for rotation clockwise or counterclockwise about the horizontal reference position which it is shown to occupy in FIG. 4. The axis of its rotation is the axis 26 of a shaft 28 on which the rocker arm pivots. The second control element is best shown in FIG. 3 where it is identified by the reference numeral 30. It comprises a lever rotatable about a mounting pin 32. Means for displacing the two control elements are provided in the invention and that means comprises a displacement element which can be moved to different positions to alter the position of the two control elements in a predetermined, coordinated manner. The invention also comprises a motion translating means interposed between the displacement element and the control element and which contributes to that coordination. In the embodiment selected for detailed description here, the operating handle comprises the displacement element. It cooperates with the motion translating means which in this embodiment comprises two cam and cam follower sets. While their positions in one or both sets could be reversed, in this embodiment the cam followers are carried by the control elements and the cams are mounted upon a common shaft 34 which rotates about a shaft axis parallel with the axis of rotation of the control elements. The shaft 34 is mounted normal to the plane in which the slot 20 of the cover is formed. The operating handle is mounted on the shaft 34 and is used to rotate the shaft thus to rotate the cams. As best shown in FIG. 2, the two cams 36 and 38 are mounted on opposite ends of the shaft 34 and are fixed to it so that they rotate with the shaft. The cam follower associated with the speed cam 36 is formed by an upwardly extending projection 40 midway along the length of lever 30. Two followers cooperate with cam 38. They are located on opposite sides of the pivotal axis of the rocker arm 24. They are designated by the reference numerals 42 and 44.

Means are provided for overriding the speed cam. In this embodiment the operating handle shank 16 is mounted upon a plate 46 one end of which is pivotally mounted by a pin 48 to an upper portion of the clutch cam 38. The opposite end of the plate 46 bears upon the upper end of an arm 50 which is slotted to receive the cam shaft 34. The slot is formed so that vertical movement of the arm 50 is permitted. The lower end of the arm has pivotal connection to an inwardly extending pin 52 carried by, and in this case shown integrally formed with, the second control element or pivotal shaft 30. In FIG. 2, counterclockwise rotation of the operating handle shank 16 results in counterclockwise rotation of the plate 46 about its pivot pin 48. This action results in depression of the arm 50 forcing the arm 30 downwardly so that it rotates in a clockwise direction in FIG. 3. Such rotation, it will be seen, results in an action that increases prime mover speed. Such clockwise motion of the operating lever to override the speed cam is prevented in this particular embodiment except when the operating handle has a position opposite the "NEUTRAL THROTTLE" position so that it can be moved into the slot 22.

Returning to FIG. 3, near its end opposite the end at which it is pivoted the lever 30 is provided with a hole in which an idle speed adjusting screw 60 is threadedly engaged. The upper end 62 of that screw is knurled and it extends above the cover face 14 so that it is accessible for adjustment by the boat operator. The lower end of screw 60 projects downwardly from the under side of lever 30 a distance depending upon the degree of its threaded insertion. It bears upon the upper face of a second pivoted lever 64. This lever is pivoted upon a pivot pin whose axis is parallel with that of the pin 32 on which lever 30 is pivoted. The other end of lever 64 is provided with a lower, rounded cam surface 68 which bears against the end wall of a cylinder 70 which contains a piston 72. The latter is fixed to the housing 10 and is provided with a central bore through which hydraulic fluid may flow. The cylinder is filled with hydraulic fluid and when it is pressed downwardly toward the fixed piston 72, some of that hydraulic fluid is forced through the passageway 74 to a speed control or throttle unit 73 which cooperates with the prime mover to adjust the prime mover's speed. Referring to FIG. 3, rotation of the speed cam 36 in a way that makes it bear against the follower 40 to rotate the lever 30 downwardly, forces the end of pin 60 against the upper intermediate surface of lever 64. The latter is rotated in a counterclockwise direction whereby its opposite end at cam 68 bears against the cylinder 70 forcing it downwardly over its piston 72 and forcing hydraulic fluid through passageway 74 to the speed control unit 73. Counter pressure in that hydraulic system tends to force the piston 70 upwardly to rotate lever 64 clockwise and lever 30 counterclockwise when the cam 36 has been rotated to a position permitting that motion.

In FIG. 5, rotation of the clutching cam 38 results in displacement of the rocking arm 24 and actuation of two cylinders carried one at each end of the rocking shaft. These cylinders furnish hydraulic fluid to a reversing clutch unit 76. Cylinder 78 is connected by a link 80 and a pivot pin 81 to the right end, in FIG. 5, of the rocking shaft 24. While not visible in the drawing link 80 has a pivotal connection to a point along the length of the cylinder 78 to prevent binding between the cylinder and its fixed piston 82. Piston 82, and the piston 83 of the other hydraulic piston and cylinder set, are fixed to the housing 10. Both of the piston 82 and 83 are provided with a central bore by which hydraulic fluid is applied to the reversing clutch. The bore 84 of piston 82 leads to one side of the clutch and the bore 86 of piston 83 connects to the other side of the clutch. Piston 83 is surrounded by movable cylinder 88 which has a connection by a link 90 to a pivot pin 92 carried by the rocker arm 24. Counterclockwise rotation of the rocker arm lifts the cylinder 78 to increase internal cylinder volume while it lowers cylinder 88 to decrease volume in that cylinder. As a consequence hydraulic fluid contained in the cylinder 88 is forced through the passageway 86 to the reversing clutch 76. An equal volume of hydraulic fluid flows out of the reversing clutch through the flow path 84 to the interior of cylinder 78 whose internal volume is expanding. That has the effect of actuating the reversing clutch 76 so that the interconnection between the motive means and the propulsion apparatus is in a direction to back down the boat in which the system is carried. Conversely, clockwise rotation of the rocker arm 24 results in motion of the hydraulic fluid in the opposite direction through the reversing clutch whereby the prime mover and propulsion apparatus are interconnected for forward motion.

The character and interrelationship between the movement of the two control elements in response to a given motion of the displacement member or operating handle is determined by the shape of the cams 38 and 36. Those cams are shaped such that for a given degree of rotation of the handle shaft 16 from its neutral position the lever 30 will not be pivoted from the reference position it is shown to have in FIG. 3 but rocker arm 24 will be pivoted from the reference position it is shown to occupy in FIG. 4. If the handle is moved forward the rocker arm will be pivoted clockwise in FIG. 4. If the operating handle is moved to the "ASTERN" position, rocker arm 24 will be rotated counterclockwise to occupy the position it is shown to have in FIG. 5. This action results from the fact that segment 90 of the cam surface of cam 36 describes a circular surface around the axis of rotation of the cam. That circular segment engages the cam follower for all rotational positions of the operating lever from "ASTERN" to "AHEAD." In this segment of operating handle movement one or the other or both of the cam followers 42 and 44 engage segments of the cam surface 38 which are progressively more distant from the axis of rotation of the cam at increasing distance from the plane that contains the axis of rotation of both the cam and the rocker arm. Thus as the operating handle is moved from the "-NEUTRAL" position to the "AHEAD" position cam 38 is rotated clockwise, the sloping cam surface 92 is lifted from follower 44 and the sloping cam surface 94 drives the follower 42 downwardly to produce a clockwise rotation of the rocker arm 24. Motion of the operating handle from the "-NEUTRAL" position to the "ASTERN" position lifts cam 38 from the follower 42 while engagement of follower 44 with sloping cam surface 92 drives the follower downwardly to produce a counterclockwise displacement of the rocker arm 24.

The two sloping segments 92 and 94 extend from the region of the center of the cam outwardly to the point of beginning of respectively associated circular cam surface segments 96 and 98. These circular segments define a single circle having a center at the axis of rotation of the cam. Consequently, once the cam follower 44 or 42 has reached a circular segment of the cam, the rotational displacement of the rocker arm will be complete and no further displacement will take place as the operating handle is moved to the fast forward or the fast astern position. This will be apparent in FIG. 5.

On the other hand, the speed cam 36 has a cam surface segment at each side of the circular segment 90 in which distance to the center of the cam rotation changes with distance from the circular segment. In this embodiment that change is such that the distance increases with distance from the circular segment. Thus whether the cam 36 is rotated clockwise or counterclockwise to a point beyond the circular cam segment 90 to the cam surface 100 or 102, the lever 30 will be driven downwardly or clockwise, in FIG. 3, in an amount which increases with the degree of rotation of the cam from its reference position.

In this embodiment the angular length of the circular segment 90 of the speed cam is equal to the angular length of the segments between the two circular segments of the clutch cam whereby no movement of the lever 30 results from movement of the control handle to any position from "AHEAD" to "ASTERN," other than a position in slot 22, and whereby no change in the rotational position of clutch rocker arm 24 is experienced as an incident to positioning of the control handle forward of the "AHEAD" position or rearwardly of the "ASTERN" position. This is the preferred embodiment. In other embodiments it may be advantageous to have the output element movements overlap or, conversely, to form the cam surfaces so that neither output element is repositioned over some given segment of operating handle movement.

Although I have shown and described certain specific embodiments of my invention, I am fully aware that many modifications thereof are possible. My invention, therefore, is not to be restricted except insofar as is necessitated by the prior art and by the spirit of the appended claims.

I claim:

1. In a speed and direction controller, in combination:

first, second and third movable elements displacable from respectively associated reference positions, the first and second elements each being movable in predetermined degree in opposite directions from their respectively associated reference positions; and displacement means for displacing said first and second elements oppositely relative to their respective references and selectively in either direction and for displacing said third element in selected degree from its reference position upon displacement of said first and second elements in said predetermined degree in either of said opposite directions;

said displacement means comprising a lever, means connecting spaced points of said lever with said first and second displacable elements, said lever being mounted for rotation about a pivot point intermediate said spaced points, means for pivoting said lever about its pivot point comprising a cam follower carried by said lever and a cam mounted for rotation and engageable with said follower, said cam and follower having shape to effect rotation of said lever in one direction in proportion to the degree of rotation of said cam in one direction through a predetermined angular degree of rotation and to be effective to rotate said lever as an incident to rotation of the cam in greater degree, said cam and cam follower being further effective to rotate said lever oppositely as an incident to opposite rotation of said cam through a selected degree of rotation and thereafter to be ineffective to cause rotation of said lever as an incident to rotation of said cam in greater angular degree.

2. The invention defined in claim 1 in which said displacement means comprises a second cam interconnected with said first mentioned cam and rotatable therewith, and a cam follower carried by said third displacable element and engageable with said second cam; means for rotating said first mentioned and said second cam simultaneously, said second cam and its follower having shape such that the follower of said second cam is moved as an incident to movement of said means for rotating both of the cams in a degree not less than said predetermined angular degree.

3. The invention defined in claim 2 in which said means for displacing both of said cams is capable of movement without rotating either of said cams, and which further comprises interconnecting said means for moving both of said cams for displacing said third element as an incident to movement of said means for moving both of said cams in a manner not affecting movement of said cams.

4. A controller comprising:

a first control element pivotally mounted for rotational displacement to positions in opposite directions from a reference position to end positions;

a second control element pivotally mounted for rotational displacement to positions in one direction from an initial position;

a displacement element displacable in a plane through first and second end ranges of positions and a midrange of positions between said end ranges including a reference position within said midrange of positions;

motion translating means responsive to the position of said displacement element for positioning said first control element such that it occupies its reference position when the displacable element occupies its reference position, and such that it occupies positions between its reference position and one of its end positions when the displacable element occupies a position in its midrange of positions on the side of its reference position toward its first end range of position, and such that the first control element occupies positions between its reference position and the other of its end positions when the displacable element occupies a position in its midrange of positions on the other side of its reference position toward its second end range of positions, and such that said first control element occupies one or the other of its end positions when said displacable element occupies a position in the first or second, respectively, of its end ranges;

said motion translating means further being responsive to the position of said displacement means for positioning said second control element such that it occupies its reference position when the displacement element is positioned within its midrange of positions, and such that said second control element is displaced from its reference position when the displacement element occupies either of its end range of positions.

5. The invention defined in claim 4 in which said displacement element is displacable in a second plane intersecting the first mentioned plane at the reference position of said displacement element and in which said motion translating means is effective, when said displacement element occupies a position in the second plane other than its reference position, to position said second control element at other than its reference position.

6. The invention defined in claim 4 in which each said first and second control elements include one of a cam and cam follower of a pair of cam and follower sets and in which said displacement element includes the other of the cam and cam follower of both of said sets.

7. The invention defined in claim 6 which comprises a shaft rotatable upon its shaft axis, the cam of both of said cam and follower sets being carried on said shaft, and said displacement element comprising a handle operative to rotate said shaft.

8. The invention defined in claim 7 in which said second control element comprises a lever rotatable on an axis parallel to said shaft axis and carrying the follower of one of said cam and follower sets; the cam of that set having a cam surface including a generally circular segment separating segments whose distance from said shaft axis changes with distance from said circular segment.

9. The invention defined in claim 7 in which said handle has pivotal connection to said shaft permitting handle rotation in a second plane other than the plane normal to said shaft axis, said motion translation means being responsive to handle rotation in said second plane to position said second control element at other than its reference position.

10. The invention defined in claim 7 in which said first control element comprises a rocker arm mounted for rotational displacement at an intermediate point along its length upon an axis parallel to said shaft axis; a cam follower mounted on said rocker arm and comprising two follower elements located at opposite sides of said intermediate point; one of the cams carried by said shaft having a cam surface including generally circular segments of the same circle centered at said shaft axis separated by surface segments which are progressively less distant from said shaft axis in the direction away from said circular segments.

11. The invention defined in claim 10 in which said second control element comprises a lever rotatable on an axis parallel to said shaft axis and carrying the follower of one of said cam and follower sets; the cam of that set having a cam surface including a generally circular segment separating segments whose distance from said shaft axis changes with distance from said circular segment.

12. The invention defined in claim 11 in which the angular separation of the circular segments of the cam having two circular segments is substantially equal to the angular length of the circular segment of the other cam.

13. The invention defined in claim 12 which further comprises three hydraulic piston and cylinder assemblies one connected to said second control element and two connected to said rocker arm such that one is connected to each side of the rotational axis of said rocker arm; said piston and cylinder assemblies being mounted and having connection to said second control element and rocker arm such that their pistons and cylinders are displaced relative to one another as an incident to displacement of the second control element and of the rocker arm to which they are connected, respectively.